United States Patent
Wilkinson et al.

[11] Patent Number: 6,108,310
[45] Date of Patent: Aug. 22, 2000

[54] DISPLAY OF NETWORK TRAFFIC ATTRIBUTES BASED ON FREQUENCY DISTRIBUTION

[75] Inventors: Andrew Wilkinson, Citrus Heights; Heidi Hodges; Rosa A. Lozano, both of Roseville, all of Calif.

[73] Assignee: Hewlett-Packard Company, Palo Alto, Calif.

[21] Appl. No.: 08/928,062

[22] Filed: Sep. 12, 1997

[51] Int. Cl.[7] .................................................. H04J 3/14
[52] U.S. Cl. ............................................ 370/252; 370/254
[58] Field of Search ................................... 370/241, 248, 370/252, 254, 229, 230, 231, 235; 340/825.06; 709/223, 224; 714/1, 47

[56] References Cited

U.S. PATENT DOCUMENTS

| | | | |
|---|---|---|---|
| 5,793,753 | 8/1998 | Hershey et al. | 370/252 |
| 5,819,028 | 10/1998 | Manghirmalani et al. | 395/185.1 |
| 5,926,462 | 7/1999 | Schenkel et al. | 370/254 |
| 5,933,416 | 8/1999 | Schenkel et al. | 370/254 |
| 5,987,442 | 11/1999 | Lewis et al. | 706/10 |

OTHER PUBLICATIONS

*Network General Corporation Products and Services*, available from Network General Corporation as part No. 24200–005, May 1995, p. 7,8.

*Primary Examiner*—Alpus H. Hsu

[57] ABSTRACT

A method is used for monitoring network traffic. For a plurality of time periods, percent utilization of one or more network segments is determined. This is done in order to generate utilization data. The utilization data is organized to produce organized utilization data. The first organized utilization data indicates a percent frequency of the plurality of time periods during which the first network segment is at least equal to each value of percent utilization. The first organized utilization data is displayed in a graph. The graph has a first axis which indicates percent utilization and a second axis which indicates percent frequency.

20 Claims, 4 Drawing Sheets

DISPLAY OF NETWORK TRAFFIC ATTRIBUTES BASED ON FREQUENCY DISTRIBUTION

BACKGROUND

The present invention concerns analysis of network traffic over network segments and pertains particularly to the display of network traffic attributes based on frequency distribution.

Communication between computers and other computing equipment is achieved through various types of networks. For computers and computer equipment within fairly close proximity, local area networks are often connected using a local area network (LAN). For computers and computer equipment separated by a greater distance, wide area networks (WAN) may be used to make the connections.

Often LANs and/or WANs are connected together in order for one computer on a LAN or a WAN to communicate with another computer in a different LAN or WAN. LANs and WANs may be joined, for example, using a network bridge or a network router. Each of the individual LAN and WAN may be considered a network segment of a larger network.

It is often desirable to monitor the operation and status of various network segments. For example, network traffic may be monitored and the results forwarded to an application or management platform for further processing and/or for being made available to a user.

Network traffic may be monitored, for example, by collecting a number of bytes passed through a representative network device for one or more monitored network segments. The utilization of each segment is the percentage of the capacity used. For example, for a particular time period, the utilization is equal to the number of bytes transferred across a network segment during the time period divided by the theoretical maximum number of bytes that could have been transferred across the network segment during the time period. The utilization is generally organized in order of time. The utilization data is displayed by percent utilization versus time in a line graph for either single or multiple segments at a time. This is essentially a chronological view of sequential data points. Alternatively, the utilization data may be displayed by percent utilization at a particular point of time. Additionally, the utilization data may be displayed by showing bytes per second or frames per second. See for example, the Foundation Manager™ network monitoring application and the Network General® Reporter application described in the brochure, Network General Corporation Products and Services, May 1995, available from Network General Corporation as Part Number 24200-005, pages 7 and 8.

One disadvantage of displaying percent utilization over time in a line graph is that it is difficult to determine how often the network is over-utilized or under utilized. This information is available to a user only by mental calculation and imagination.

SUMMARY OF THE INVENTION

In accordance with the preferred embodiment of the present invention, a method is presented which is used for monitoring network traffic. For a plurality of time periods, percent utilization of one or more network segments is determined. This is done in order to generate utilization data. The utilization data is organized to produce organized utilization data. The first organized utilization data indicates a percent frequency of the plurality of time periods during which the first network segment is at least equal to each value of percent utilization. The first organized utilization data is displayed in a graph. The graph has a first axis which indicates percent utilization and a second axis which indicates percent frequency.

In the preferred embodiment, the utilization data is generated by collecting, for each time period, a number of bytes which pass through a representative network device for each network segment. The percent utilization of each network segment during each time period is calculated, based on the number of bytes collected. For example, each time period is approximately one second.

Also in the preferred embodiment, a threshold percent utilization is displayed in the graph.

The present invention provides a means by which a user can easily determine how often the percent utilization of a network segment meets or exceeds a particular threshold.

DESCRIPTION OF THE PREFERRED EMBODIMENT

Figure 1:
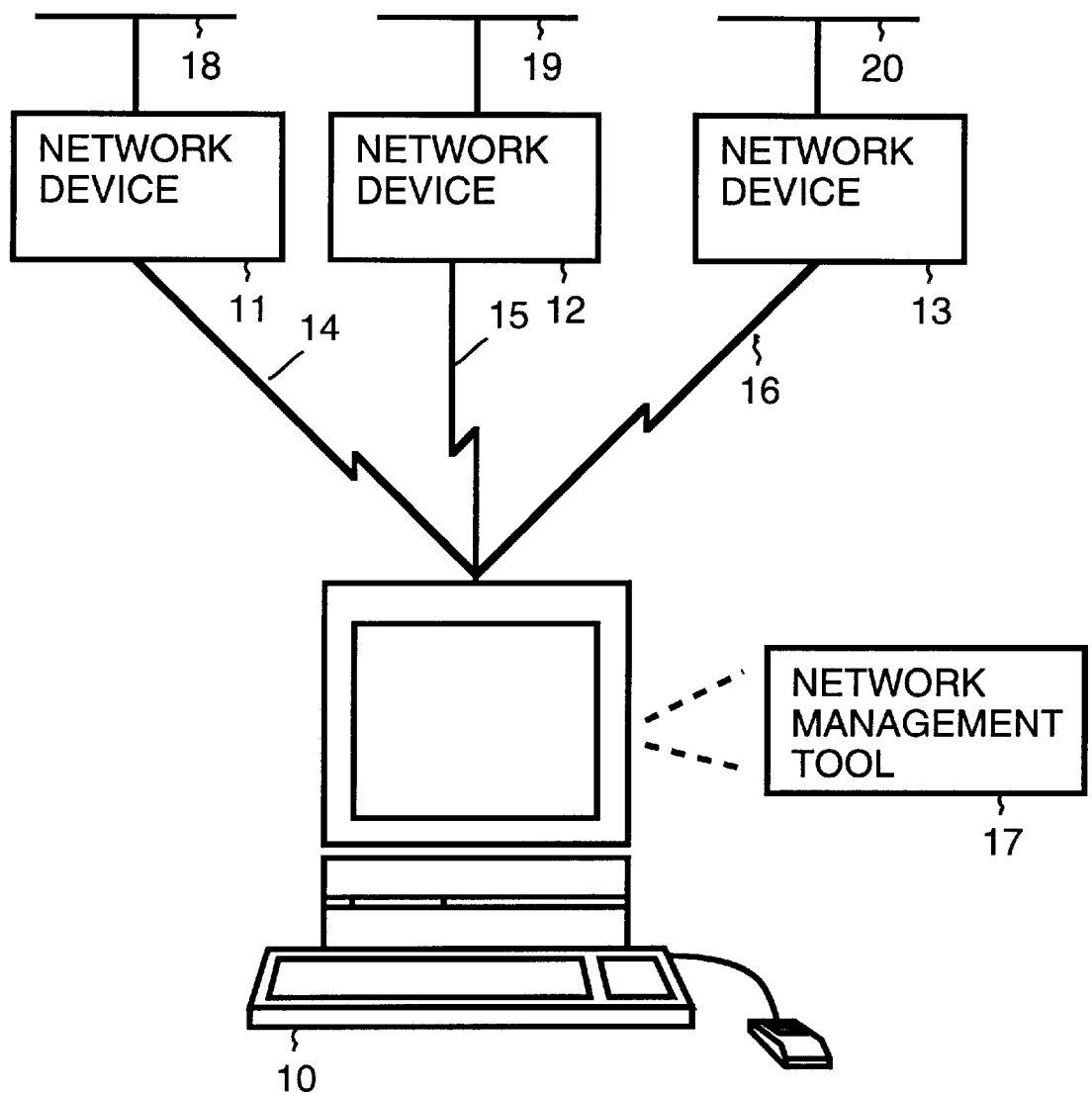
FIG. 1 is a simplified block diagram which shows network devices monitored by a computing system.

FIG. 1 is a simplified diagram which shows a computing system 10 on which is run a network management tool 17. Computing system 10 monitors network traffic through a network segment 18, a network segment 19 and a network segment 20. For example, this is done by collecting, for a number of time periods, a number of bytes which pass through a network device connected to each network segment. For example, a network device 11 is connected to network segment 18. A network device 12 is connected to network segment 19. A network device 13 is connected to network segment 20. Such monitoring of network traffic through each of network devices 11, 12 and 13 provides fairly accurate information of network utilization of the network segments 18, 19 and 20, respectively. Each of network devices 11 through 13 is, for example, a network bridge, a network switch or some other network device which is connected to a network segment.

Network device 11 is connected to computer system 10 through a network data path 14. Network device 12 is connected to computer system 10 through a network data path 15. Network device 13 is connected to computer system 10 through a network data path 16.

Figure 2:
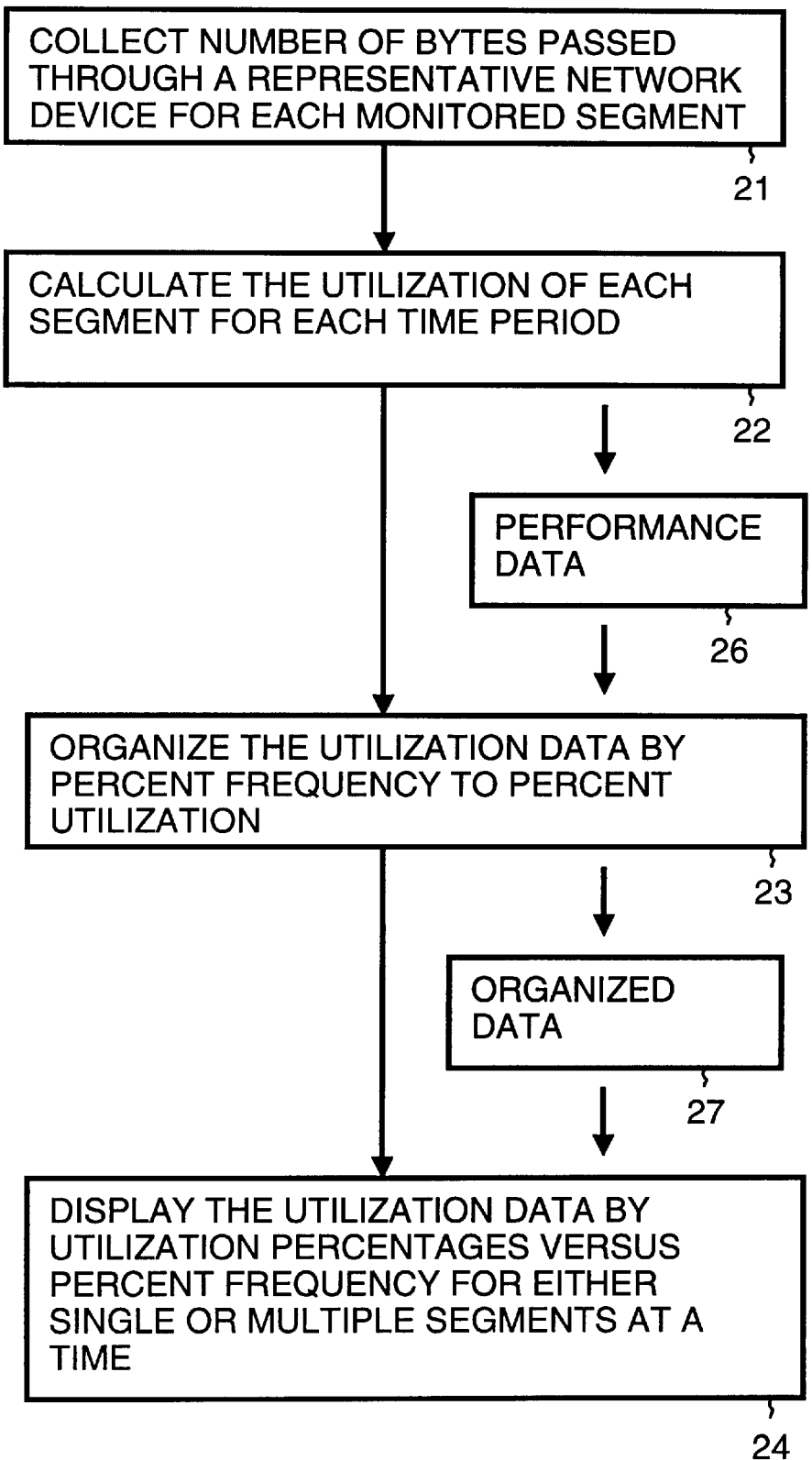
FIG. 2 is a simplified flowchart which describes the process by which network utilization is displayed based on percent frequency in accordance with the preferred embodiment of the present invention.

FIG. 2 is a simplified flowchart which describes the process by which network utilization is displayed based on percent frequency in accordance with the preferred embodiment of the present invention. In a step 21, network traffic over network segment 18, network segment 19 and network segment 20 is monitored, for example, by collecting a number of bytes passed through each of network device 11, network device 12 and network device 13. For example, collection occurs approximately once every second from each of network device 11, network device 12 and network device 13. The number of bytes which passes through network device 11 indicates utilization of network segment 18. The number of bytes which passes through network device 12 indicates utilization of network segment 19. The number of bytes which passes through network device 13 indicates utilization of network segment 20.

For example, in multi-port network devices such as a switch, when calculating the number of bytes which pass through the network device, this can be done by counting the number of bytes which pass through the backbone of the switch. In an alternative embodiment, in multi-port network device such as a switch, when calculating the number of bytes which pass through the network device, only the bytes which pass through the port connected to the pertinent network segment are counted. For example, device counter collection can be performed by the HP J3245A Advance Stack Switch 800T available from Hewlett-Packard Company.

While only three network segments, various embodiments of the invention could include, for example, only one network segment, two network segments, four network segments or more network segments.

In a step 22, network management tool 17 calculates for each of network segment 18, network segment 19 and network segment 20, percent utilization for each time period. Percent utilization is the amount of data transferred over the network segment during the time period divided by the maximum amount of data which could be transferred over the network segment during the time period. One hundred percent utilization is the maximum theoretical transfer capacity of the network segment per time period. Thus if in step 21, network device 11 detects at a first time period that a first number of bytes pass through network device 11, and for maximum utilization a second number of bytes passes through network device 11 per time period, then network utilization for the first time period is the first number divided by the second number. For example, for a network segment with a capacity of 10 megabits per second, transfer of 4 megabits per second would result in a 40% utilization. Step 22 generates utilization data 26.

In a step 23, utilization data 26 is organized by percent frequency to percent utilization. That is, network management tool 17 determines what percentage of time periods the network segment is at each percent utilization. For example, if a thousand time periods are monitored and in twenty of the time periods the network utilization is at a percent utilization of 25%, these twenty time periods are grouped together to indicate that for a two percent frequency of the collected times the percent utilization is 25%. Step 23 generates organized utilization data 27.

In a step 24, organized utilization data 27 is displayed in a graph which shows percent frequency versus percent utilization. That is, network management tool 17 displays what percentage of time the network segment is at least equal to each value of percent utilization.

Figure 3:
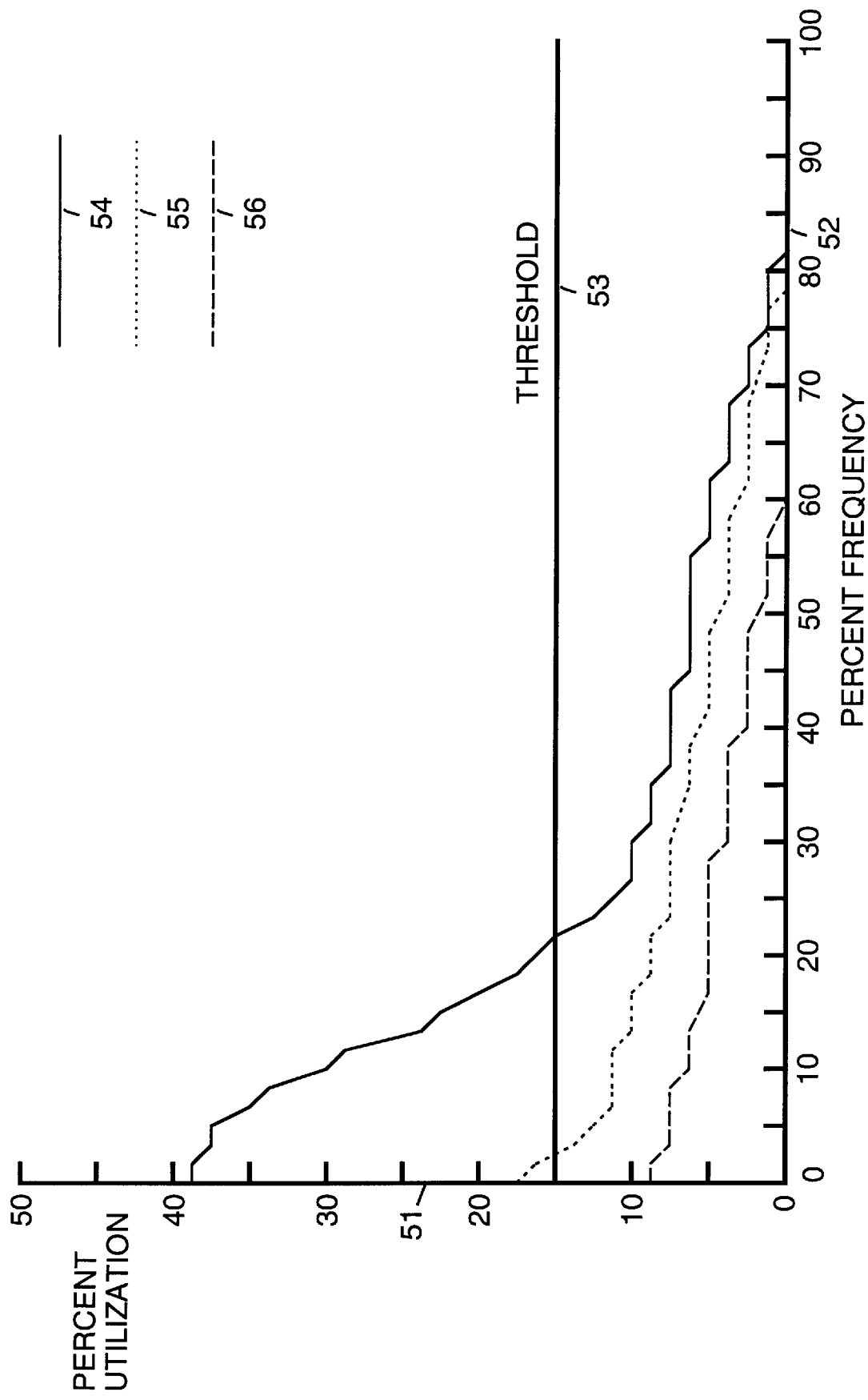
FIG. 3 shows network utilization being displayed based on percent frequency in accordance with the preferred embodiment of the present invention.

FIG. 3 gives an example of organized utilization data 27 being displayed in a graph which indicates a percent frequency of the plurality of time periods during which the first network segment is at least equal to each value of percent utilization. A vertical axis 51 shows percent utilization. A horizontal axis 52 shows percent frequency for which a percent utilization is displayed. A separate trace is shown for each of network device 11, network device 12 and network device 13 and thus their associated monitored network segments.

For example, a trace 54 represents percent utilization of network segment 18. A trace 55 represents percent utilization of network segment 19. A trace 56 represents percent utilization of network segment 20.

A threshold 53 is shown. Threshold 53, for example, is at a percent utilization which indicates a user-configured limit for desired network usage.

For example, when network utilization for a network segment exceeds the threshold, the throughput of the network segment begins to be significantly impacted by collisions. When as in FIG. 3, the organized utilization data for each network segment is displayed in a graph which indicates a percent frequency of the plurality of time periods during which the first network segment is at least equal to each value of percent utilization, it is easy for a network manager to determine how often network segment utilization exceeds the threshold.

For example, FIG. 3 shows that the percent utilization for network segment 18 exceeds the threshold utilization approximately 22% of the time. Likewise, FIG. 3 shows that the percent utilization for network segment 19 exceeds the threshold utilization approximately 3% of the time. The percent utilization for network segment 20 never exceeds the threshold.

This display is clearly an improvement over the prior art display where the utilization is generally organized in a sequential chronology. That is, the utilization data is displayed by percent utilization verses time in a line graph for either single or multiple segments at a time.

Figure 4:
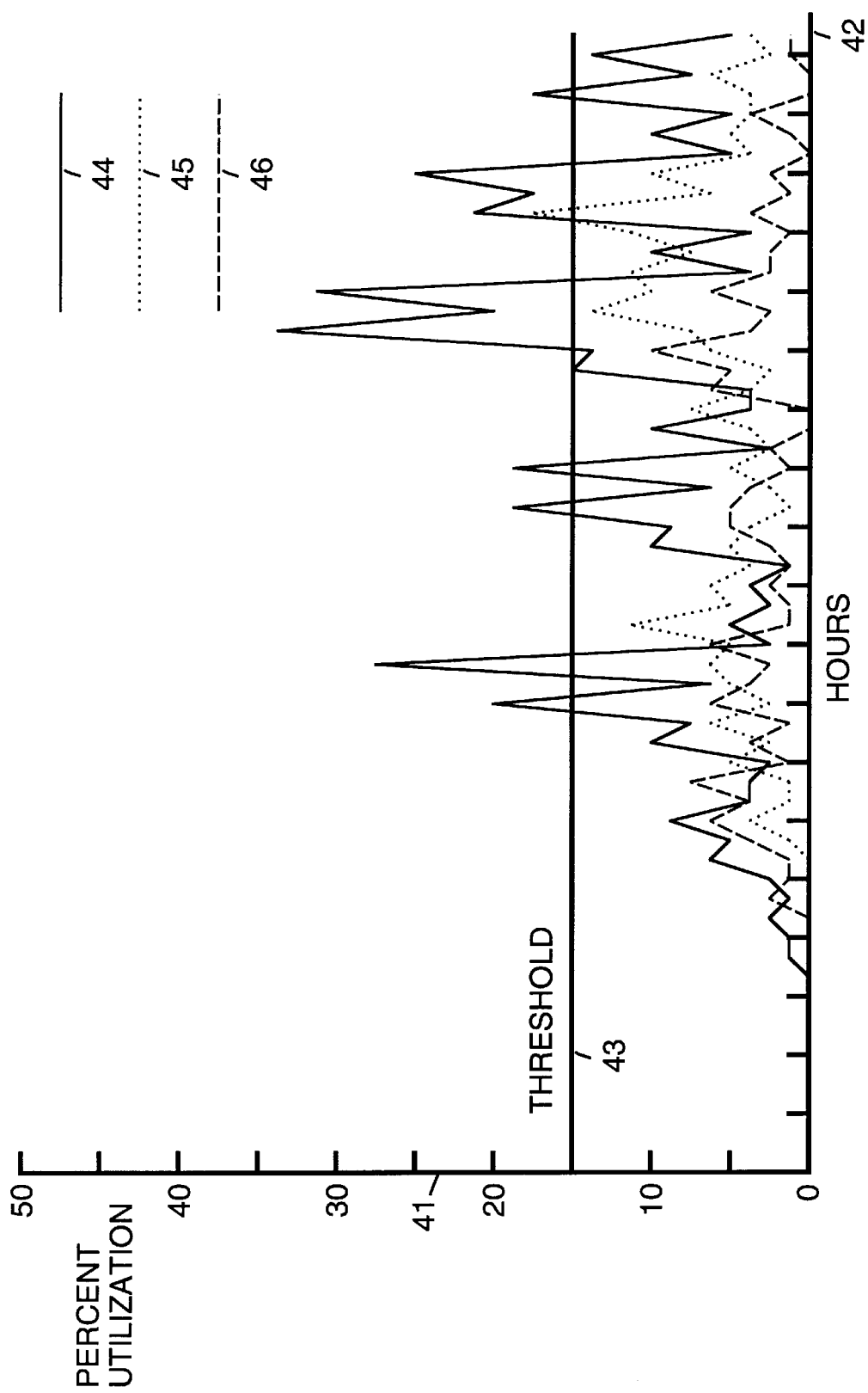
FIG. 4 shows network utilization being displayed as a chronological view of sequential data points in accordance with the prior art.

FIG. 4 shows an example of such a prior art display. A vertical axis 41 shows percent utilization. A horizontal axis 42 shows chronological time. A separate trace is shown for each of network device 11, network device 12 and network device 13 and thus their associated monitored network segments.

For example, a trace 44 represents data utilization of network segment 18. A trace 45 represents data utilization of network segment 19. A trace 46 represents data utilization of network segment 20.

A threshold 43 is shown. Threshold 43, for example, is at a percent utilization which indicates a user-configured limit for desired network usage. For example, when network utilization for a network segment exceeds the threshold, the throughput of the network segment begins to be significantly impacted by collisions. From FIG. 4 it is possible to see when utilization of a network segment exceeds the threshold. However, from the graph shown in FIG. 4 it is very difficult to determine exactly how often network segment utilization exceeds the threshold.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method used for monitoring network traffic comprising the following steps:

(a) determining, for a plurality of time periods, percent utilization of a first network segment in order to generate first utilization data;

(b) organizing the first utilization data to produce first organized utilization data, so that the first organized utilization data indicates a percent frequency of the plurality of time periods during which the first network segment is at least equal to each value of percent utilization; and, (c) displaying the first organized utilization data, in a graph which has a first axis which indicates percent utilization and which has a second axis which indicates percent frequency.

2. A method as in claim 1 additionally comprising the following steps:

(d) determining, for the plurality of time periods, percent utilization of a second network segment in order to generate second utilization data;

(e) organizing the second utilization data to produce second organized utilization data, so that the second organized utilization data indicates a percent frequency of the plurality of time periods during which the second network segment is at least equal to each value of percent utilization; and, (f) displaying the second organized utilization data in the graph.

3. A method as in claim 2 additionally comprising the following steps:

(g) determining, for the plurality of time periods, percent utilization of a third network segment in order to generate third utilization data;

(h) organizing the third utilization data to produce third organized utilization data, so that the third organized utilization data indicates a percent frequency of the plurality of time periods during which the third network segment is at least equal to each value of percent utilization; and, (i) displaying the third organized utilization data in the graph.

4. A method as in claim 3 wherein step (g) comprises the following substeps:

(g.1) collecting, for each time period, a number of bytes which pass through a representative network device on the third network segment; and, (g.2) calculating, based on the number of bytes collected in substep (g.1), percent utilization of the third network segment during each time period.

5. A method as in claim 3 wherein in step (g) each time period is approximately one second.

6. A method as in claim 2 wherein step (d) comprises the following substeps:

(d.1) collecting, for each time period, a number of bytes which pass through a representative network device on the second network segment; and, (d.2) calculating, based on the number of bytes collected in substep (d.1), percent utilization of the second network segment during each time period.

7. A method as in claim 1 wherein step (c) additionally comprises displaying a threshold percent utilization in the graph.

8. A method as in claim 1 wherein step (a) comprises the following substeps:

(a.1) collecting, for each time period, a number of bytes which pass through a representative network device on the first network segment; and, (a.2) calculating, based on the number of bytes collected in substep (a.1), percent utilization of the first network segment during each time period.

9. A method as in claim 1 wherein in step (a) each time period is approximately one second.

10. Storage media which contains software which when run on a computing system performs a method used for monitoring network traffic, the method comprising the following steps:

(a) determining, for a plurality of time periods, percent utilization of a first network segment in order to generate first utilization data;

(b) organizing the first utilization data to produce first organized utilization data, so that the first organized utilization data indicates a percent frequency of the plurality of time periods during which the first network segment is at least equal to each value of percent utilization; and, (c) displaying the first organized utilization data, in a graph which has a first axis which indicates percent utilization and which has a second axis which indicates percent frequency.

11. Storage media as in claim 10 wherein the method additionally comprises the following steps:

(d) determining, for the plurality of time periods, percent utilization of a second network segment in order to generate second utilization data;

(e) organizing the second utilization data to produce second organized utilization data, so that the second organized utilization data indicates a percent frequency of the plurality of time periods during which the second network segment is at least equal to each value of percent utilization; and, (f) displaying the second organized utilization data in the graph.

12. Storage media as in claim 11 wherein the method additionally comprises the following steps:

(g) determining, for the plurality of time periods, percent utilization of a third network segment in order to generate third utilization data;

(h) organizing the third utilization data to produce third organized utilization data, so that the third organized utilization data indicates a percent frequency of the plurality of time periods during which the third network segment is at least equal to each value of percent utilization; and, (i) displaying the third organized utilization data in the graph.

13. Storage media as in claim 12 wherein step (g) comprises the following substeps:

(g.1) collecting, for each time period, a number of bytes which pass through a representative network device on the third network segment; and, (g.2) calculating, based on the number of bytes collected in substep (g.1), percent utilization of the third network segment during each time period.

14. Storage media as in claim 12 wherein in step (g) each time period is approximately one second.

15. Storage media as in claim 11 wherein step (d) comprises the following substeps:

(d.1) collecting, for each time period, a number of bytes which pass through a representative network device on the second network segment; and, (d.2) calculating, based on the number of bytes collected in substep (d.1), percent utilization of the second network segment during each time period.

16. Storage media as in claim 10 wherein step (c) additionally comprises displaying a threshold percent utilization in the graph.

17. Storage media as in claim 10 wherein step (a) comprises the following substeps:

(a.1) collecting, for each time period, a number of bytes which pass through a representative network device on the first network segment; and, (a.2) calculating, based on the number of bytes collected in substep (a.1), percent utilization of the first network segment during each time period.

18. A method used for monitoring network traffic comprising the following steps:

(a) determining, for a plurality of time periods, percent utilization of a plurality of network segments in order to generate utilization data;

(b) organizing the utilization data to produce organized utilization data, so that the organized utilization data indicates, for each network segment, a percent frequency of the plurality of time periods during which each network segment is at least equal to each value of percent utilization; and, (c) displaying the organized utilization data, in a graph which has a first axis which indicates percent utilization and which has a second axis which indicates percent frequency.

19. A method as in claim 18 wherein step (a) comprises the following substeps:

(a.1) collecting, for each time period, a number of bytes which pass through a representative network device for each network segment; and, (a.2) calculating, based on the number of bytes collected in substep (a.1), percent utilization of each network segment during each time period.

20. A method as in claim 18 wherein step (c) additionally comprises displaying a threshold percent utilization in the graph.

* * * * *